May 8, 1934.   C. S. BUSHNELL   1,958,360
INTERLOCKING SYSTEM FOR RAILROADS
Filed Nov. 22, 1929   2 Sheets-Sheet 1

INVENTOR
C. S. Bushnell,
BY Neil W. Preston,
his ATTORNEY

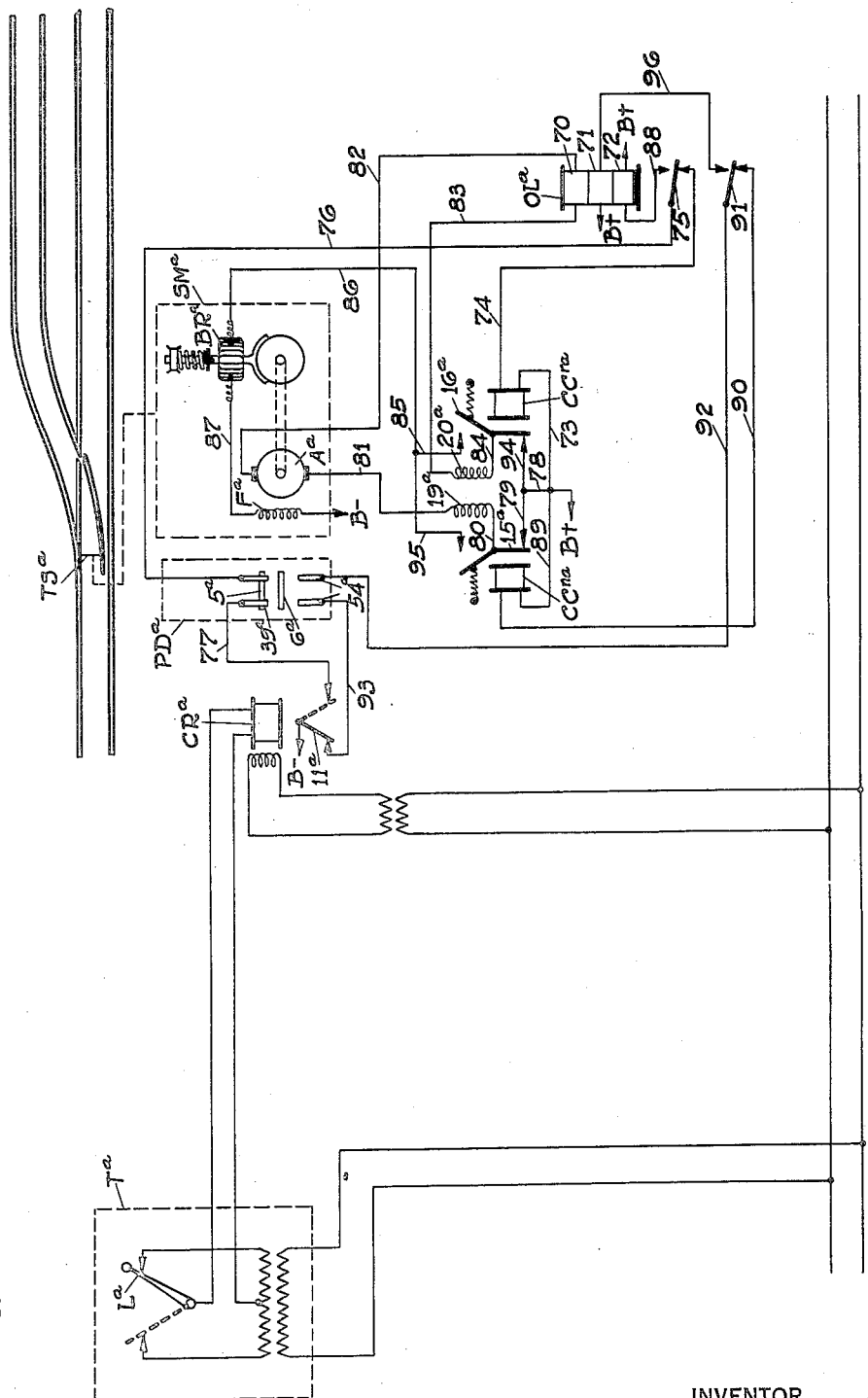

Patented May 8, 1934

1,958,360

UNITED STATES PATENT OFFICE 1,958,360

INTERLOCKING SYSTEM FOR RAILROADS

Charles S. Bushnell, Rochester, N. Y., assignor to General Railway Signal Company, Rochester, N. Y.

Application November 22, 1929, Serial No. 408,991

16 Claims. (Cl. 246—242)

This invention relates to interlocking systems for railroads, and more particularly pertains to operating circuits and devices for the remote control of switch machines in such systems.

It is desirable to provide the electric motor of a power operated switch machine with some type of overload device which will protect the motor from continued excessive overload. Such protection is necessary due to the possibility of a lump of coal or other barrier falling between the movable switch points and the stock rails of a track switch preventing its final movement, which causes the electric motor to continuously operate until its circuit is opened. Such cases have usually been provided for by the use of fuses or other overload devices in the control circuit of the switch machine.

However, in the case of a switch machine used in the type of interlocking known as "remote control interlocking," it is particularly undesirable to provide a switch machine with fuse overload protection, as the switch machine is usually located at a considerable distance from the interlocking tower, which makes it impractical to send a maintainer to the switch location each time an overload device operates. It is thus desirable that the means provided for protecting the electric motor from a continued excessive overload shall be of the type which may be remotely reset, so that the switch machine can be returned to its former position at the will of the operator.

With the above and other considerations in mind, it is proposed in accordance with the present invention to provide means for remotely controlling a switch machine, said means providing that the switch machine shall always be under the control of the operator located at a distant point. It is further proposed that the control means for the switch machine shall be provided with overload devices of the electromagnetic type which have electrical stick circuits causing them to remain in an actuated condition until the operator controls the switch machine to an opposite position. It is further proposed that the contactors controlling the operating current of the switch machine shall have electromagnetic blowout coils for facilitating the breaking of especially high overload currents. Another feature is that the switch machine is to be provided with a dynamic braking or snubbing circuit, which also serves to protect the switch machine from unauthorized operation by normally shorting its motor armature.

Other objects, purposes and characteristic features of the present invention will be in part obvious from the accompanying drawings, and in part pointed out as the description of the invention progresses.

In describing the invention in detail, reference will be made to the accompanying drawings, in which like reference characters refer to corresponding parts throughout the several views, and in which:—

Fig. 2 represents in a diagrammatic manner a modified form of the embodiment of the present invention shown in Fig. 1, as applied to a typical switch machine.

Figure 1:
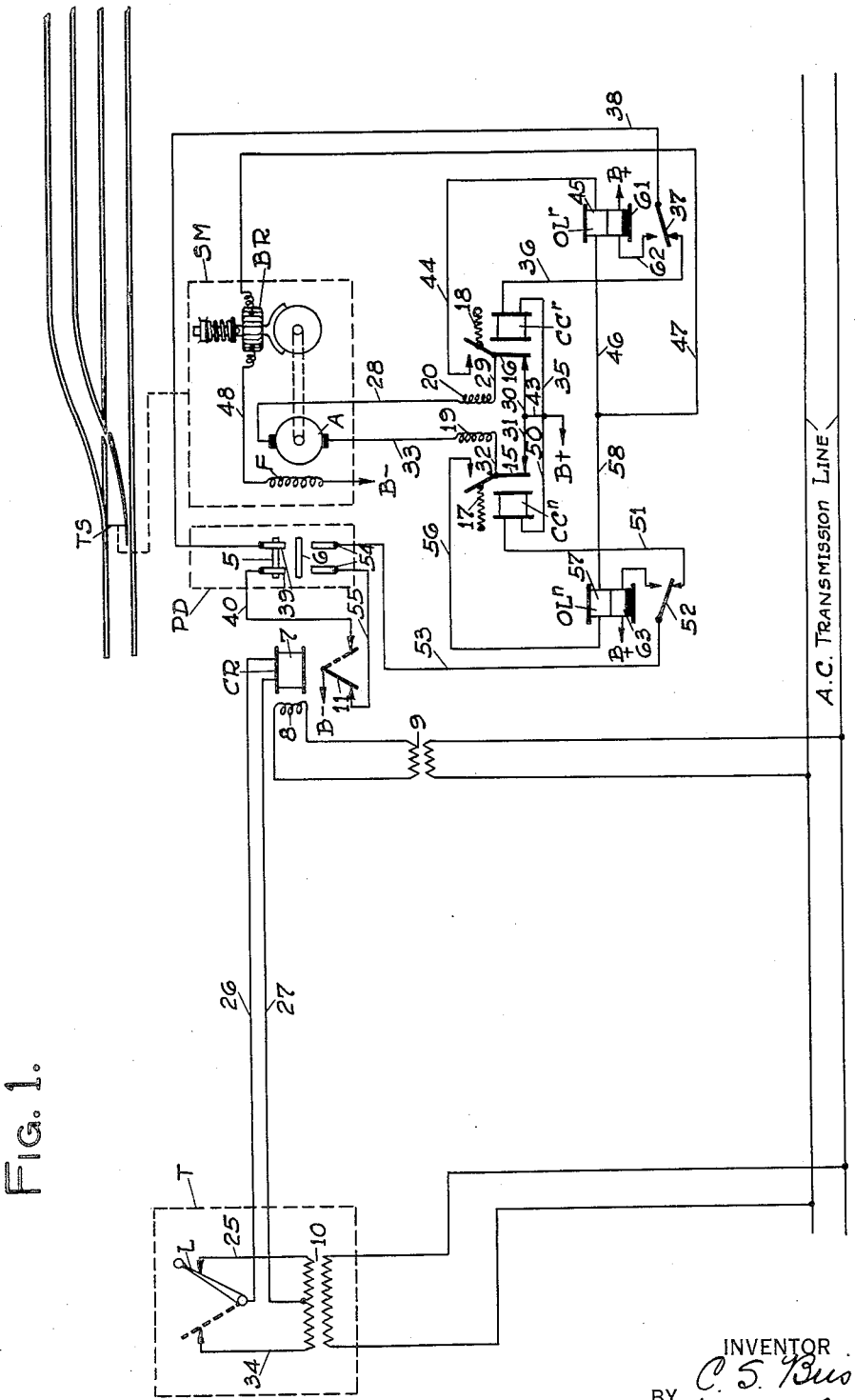
Fig. 1 represents in a diagrammatic manner one embodiment of the present invention as applied to the control of a typical switch machine.

With reference to Fig. 1 of the accompanying drawings, a track switch TS is indicated as operated by a switch machine SM in the usual well known manner. This switch machine SM includes the usual armature A and field winding F which cooperate to produce the operating torque of the switch machine. Also included therein, is a brake BR normally biased to a braking condition, which brake is operably released by the operating current of the switch machine.

Associated with both the switch machine SM and the track switch TS are the point detector contacts included within the dotted rectangle designated PD. These contacts include movable contact members 5 and 6 which assume normal or reverse extreme positions when the associated track switch TS is in corresponding normal or reverse position and locked; and which assume intermediate positions when the track switch TS is unlocked and also during its operation. The movable contact 5 makes contact between a pair of fixed contacts when in its normal and intermediate positions, while the movable contact 6 makes contact between a pair of fixed contacts when in its reverse and intermediate positions.

A control relay CR of the two phase winding type is provided to repeat the position of an associated control lever L in the interlocking tower designated by the reference character T. This relay CR is provided with a line phase winding 7 and a local phase winding 8. The local phase winding is continuously energized from a local transformer 9 which receives its energy from an alternating current transmission line extending from the interlocking tower T, while the line phase winding 7 is energized in accordance with the position of the control lever L over two line wires, receiving energy from a local transformer 10 located in the interlocking tower. A contact 11, controlled by relay CR, assumes a normal extreme position with one instantaneous relative polarity applied to the line phase winding 7, and assumes a reverse opposite extreme position with the instantaneous relative polarity reversed one hundred and eighty degrees. This control relay CR is preferably of the mechanical stick type, that is, contact 11 remains in its last operated position until operated to a new position by the application of suitable electrical energy.

Two circuit controllers $CC^n$ and $CC^r$ are used respectively for closing the normal and reverse operating circuits of the switch machine SM. These circuit controllers $CC^n$ and $CC^r$ have contacts 15 and 16 respectively which are caused to assume biased positions by their respective coil springs 17 and 18; and which are actuated to operating positions by the energization of their respective operating coils. Associated with each of these contacts 15 and 16 are magnetic blowout coils 19 and 20 respectively.

The controllers $CC^n$ and $CC^r$ each have their respective overload devices $OL^n$ and $OL^r$, which are of the slow acting electromagnetic relay type, that is, they are not operated on a quick surge of current of excessive value such as occurs during starting conditions of the switch machine, but are operated after an excessive value of current is maintained over a period of time. Also, these overload devices are preferably of the inverse time element type, that is, the greater the excessive overload current, the shorter the period of time in which they operate to open the control circuits. These overload devices OL have two windings, one of which carries the operating current of the switch machine motor and is of a comparatively low resistance, while the other winding, which is of a comparatively high resistance, is included in a stick circuit for maintaining the contacts in energized positions once they have been actuated by the operating current of the switch machine.

With reference to Fig. 2 of the accompanying drawings, the same devices or similar devices are shown with corresponding reference characters having the distinctive exponent $a$ added thereto. These similar devices operate in the same manner as explained for Fig. 1 being connected in circuits as hereafter pointed out.

In the case of Fig. 2, the normal and reverse circuit controllers $CC^{na}$ and $CC^{ra}$ respectively have associated therewith one overload device $OL^a$ in place of the two overload devices $OL^n$ and $OL^r$. The overload device $OL^a$ has an overload current coil 70 which operates the contacts of the overload device $OL^a$ in the same manner and with the same overload characteristics as explained for either of the overload devices $OL^n$ and $OL^r$. However, this overload device $OL^a$ is provided with two other windings 71 and 72 of comparatively high resistance which are included in normal and reverse stick circuits respectively for maintaining the contacts of this device in energized positions once they have been actuated by the operating overload current of the switch machine. The windings 71 and 72 are differentially connected with respect to each other, that is, each is connected cumulatively with respect to the operating current flow during the particular direction of operation of the switch machine, as and for purposes hereinafter set forth. In this connection, attention is directed to the fact that the direction of current flow in the armature $A^a$, and in turn in the coil 70, is reversed when the switch machine is operated to its reverse position, and in order to avoid the flux in the relay $OL^a$ reversing when the energization of this relay is shifted from the coil 70 to the coil 71 or 72, these coils 71 and 72 are properly poled with respect to the current flow in the coil 70.

It is believed that the usefulness of such a system and the interrelation of the various devices will be best understood by further description being given from the standpoint of operation.

Operation of the system

The operation of the system shown in Fig. 1 will be described in detail, while the operation of Fig. 2 will only be explained in detail in those points in which it differs from the operation explained for Fig. 1.

The track switch TS is shown in its normal position as last operated by the switch machine SM. The control lever L is in its normal position, energizing the line phase winding 7 of the control relay CR with such an instantaneous relative polarity as to cause its contact 11 to assume a normal left-hand position. The local phase winding 8 of the control relay CR is continuously energized from the local transformer 9, as heretofore mentioned.

The line phase winding 7 of control relay CR is energized through a normal circuit traced as follows:—from the right-hand terminal of the secondary of transformer 10, through wire 25, lever L in a right-hand position, wire 26, line phase winding 7 of control relay CR, wire 27, to the center tap of the secondary of transformer 10. The contact 11 of control relay CR is thus caused to assume a left-hand position as shown.

The motor armature A is normally short circuited through a snubbing circuit traced as follows:—from the upper terminal of armature A, through wire 28, blow-out coil 20, wire 29, contact 16 of circuit controller $CC^r$ in a normal biased position, wires 30 and 31, contact 15 of circuit controller $CC^n$ in a normal biased position, wire 32, blow-out coil 19, wire 33, to the lower terminal of the armature A. The armature A is thus prevented from being operatively energized from any unauthorized source.

Let us assume that the operator moves the lever L to a left-hand dotted line position to control the track switch TS from a normal locked condition to a reversed locked condition. A circuit is now completed for applying electrical potential, on the line phase winding 7 of the control relay CR, having an opposite instantaneous relative polarity with respect to that polarity applied with the control lever L in a right-hand normal position. This reverse energizing circuit for control relay CR is traced as follows:—from the left-hand terminal of the secondary of transformer 10, through wire 34, lever L in a left-hand dotted line position, wire 26, line phase winding 7 of control relay CR, wire 27, to the center tap of the secondary of transformer 10. The contact 11 of control relay CR is thus caused to assume a right-hand dotted line position in which a circuit is completed for energizing the circuit controller $CC^r$.

The energizing circuit for the circuit controller $CC^r$ is traced as follows:—from the positive terminal of a suitable source of electrical potential indicated as B+, through wire 35, winding of circuit controller $CC^r$, wire 36, back contact 37 of overload device $OL^r$, wire 38, contacts 5—39, wire 40, contact 11 in a right-hand dotted line position, to the negative terminal of the suitable source indicated as B—. The contact 16 of circuit controller CC$^r$ is now operated against the bias of coil spring 18 to an energized position in which the reverse operating circuit of the switch machine SM is completed. Also, the short circuit or snubbing circuit across the armature A is opened with contact 16 of circuit controller CC$^r$ in its energized position.

The reverse operating circuit of the switch machine SM is traced as follows:—from the positive terminal of a suitable source of electrical potential indicated as B+, through wires 43 and 31, contact 15 of circuit controller CC$^n$ in a normal biased position, wire 32, blow-out coil 19, wire 33, armature A, wire 28, blow-out coil 20, wire 29, contact 16 of circuit controller CC$^r$ in an energized position, wire 44, winding 45 of overload device OL$^r$, wires 46 and 47, winding of brake BR, wire 48, field winding F, to the negative terminal of the suitable source indicated at B—.

The switch machine SM now operates to unlock the track switch TS and to operate it to a reverse locked position. During this reverse operation of the track switch TS and during the time that it is unlocked, the movable contacts 5 and 6 assume central intermediate positions, thus making it possible for the switch machine SM to be reversed in mid-stroke should the operator desire to do so.

When the switch machine reaches a reverse locked position, the movable contacts 5 and 6 are operated to reverse extreme positions in which the energizing circuit for the circuit controller CC$^r$ is opened at contacts 5—39. The contact 16 of circuit controller CC$^r$ immediately assumes a biased position breaking the operating circuit of the switch machine, which is facilitated by the magnetism passing through the front contact 16 as produced by the operating current flowing through the coil 20, in a manner well understood to those skilled in the art. As soon as the contact 16 reaches a normal biased position, the shunting or dynamic braking circuit for the armature A is completed as heretofore traced, serving to bring the armature A immediately to an at rest condition. Also, with the movable contact 6 in a reverse position, the energizing circuit for the circuit controller CC$^n$ can be completed by the operation of contact 11 to a normal position. This could also be accomplished during the operation of the switch machine SM as heretofore mentioned.

Let us assume that the switch machine SM is operating the track switch TS toward a reverse locked position, as above explained. However, due to the intervening of a barrier of one kind or another between the movable points of the track switch TS and the main stock rails, the switch machine SM is unable to complete its stroke and the armature A continues rotation against the usual friction clutch (not shown) included in the switch machine. After a time the excessive current in the reverse operating circuit of the switch machine actuates contact 37 of overload device OL$^r$ to an energized position.

As soon as the contact 37 of overload device OL$^r$ reaches the energized position, a stick circuit is completed for maintaining it in this energized position until said stick circuit is otherwise opened. This stick circuit for the overload device OL$^r$ is traced as follows:—from the positive terminal of a suitable source of electrical potential indicated as B+, through winding 61 of overload device OL$^r$, wire 62, front contact 37 of overload device OL$^r$, wire 38, contacts 5—39, wire 40, contact 11 of control relay CR in a right-hand position, to the negative terminal of the suitable source indicated as B—.

When back contact 37 of overload device OL$^r$ is opened, the energizing circuit of the circuit controller CC$^r$ is opened which in turn de-energizes the motor of the switch machine and causes the armature A to cease rotation. Although there is an excessive current flow in the reverse operating circuit of the switch machine, it is easily broken by the contact 16 due to the magnetic blow-out coil associated therewith.

It is noted, that as long as the control lever L is maintained in a reverse position causing the contact 11 of control relay CR to remain in a reverse position, the stick circuit for the overload device OL$^r$ is completed for at this time (during the operation of the track switch TS) the movable contacts 5 and 6 are in their intermediate positions, which permits the operator to return the track switch to its normal position although the reverse overload device OL$^r$ is operated. To do this he returns the control lever L to the normal position, thus controlling the contact 11 to a normal position in which the stick for overload device OL$^r$ is opened and the energizing circuit for the circuit controller CC$^n$ is completed.

The energizing circuit for the circuit controller CC$^n$ is traced as follows:— from the positive terminal of a suitable source of electrical potential indicated as B+, through wire 50, winding of circuit controller CC$^n$, wire 51, back contact 52 of overload device OL$^n$, wire 53, contacts 6—54, wire 55, contact 11 in normal position. The contact 15 of the circuit controller CC$^n$ assumes an energized position which closes the normal operating circuit of the switch machine SM causing it to operate in an opposite direction to return the track switch TS to its normal locked condition.

The normal operating circuit for the switch machine SM is traced as follows:— from the positive terminal of a suitable source of electrical potential indicated as B+, through wires 43 and 30, contact 16 of circuit controller CC$^r$ in its normal biased position, wire 29, blow-out coil 20, wire 28, armature A, wire 33, blow-out coil 19, wire 32, contact 15 of circuit controller CC$^r$ in its energized position, wire 56, winding 57 of overload device OL$^n$, wires 58 and 47, winding of brake BR, wire 48, field winding F, to the negative terminal of the suitable source indicated as B—. The switch machine SM now operates the track switch TS to its normal locked condition, at which time the movable contacts 5 and 6 are caused to assume normal extreme positions opening the energizing circuit of the circuit controller CC$^n$ at contacts 6—54.

In a similar manner, if the switch machine is operating the track switch from a reversed position to a normal position and becomes stalled in mid-stroke for one reason or another, the overload device OL$^n$ operates to open the energizing circuit of the circuit controller CC$^n$; and also operates to close its own stick circuit through front contact 52 and winding 63. This stick circuit for overload device OL$^n$ is opened in a similar manner to the stick circuit of overload device OL$^r$ by the operation of contact 11 of control relay CR to its opposite or reverse position.

Such a system is particularly adaptable for remote control of switch machines, in that there is always the possibility of the power supply at a distant point being discontinued due to the opening of a circuit breaker in the central power plant, the destruction of the power line by storm or similar reasons, which would not affect the operation of the interlocking system of the present invention after reestablishment of the power supply. The control relay CR maintains its last operated position although deenergized, and the overload devices OL assume their reset positions by deenergization which serves to carry out the foregoing statement.

It is noted, that the reset condition of a particular overload device is established by deenergization of those devices associated with that overload device to accomplish the control of the switch machine to a given position. More specifically, the circuit controller $CC^n$ closes the normal operating circuit of the switch machine, the overload device $OL^n$ opens the energizing circuit of the circuit controller $CC^n$ when overload occurs in the normal operating circuit of the switch machine, and the energizing circuit of the circuit controller $CC^n$ then serves to energize the stick circuit of the overload device $OL^n$, which devices are returned to normal positions by their deenergization. This result is particularly useful should an overload device OL operate before the track switch is unlocked by the switch machine, as the movable contacts 5 and 6 would be in one extreme position in correspondence with the track switch TS and only one operating circuit of the switch machine SM could be closed. However, although this is true, the operation of the contact 11 of control relay CR to an opposite position resets the overload device for that particular operation which allows the operator in the interlocking tower to again try to unlock the track switch TS and operate it to the opposite position.

With reference to Fig. 2 of the accompanying drawings, a modified form of Fig. 1 will now be described in its characteristic differences from Fig. 1. It should be understood, however, that the form shown in Fig. 2 retains all the characteristic advantages of Fig. 1 with additional advantages that are in part obvious and in part pointed out.

Assuming the contact $11^a$ of relay $CR^a$ to be just operated to a normal right-hand position, the energizing circuit for the circuit controller $CC^{ra}$ is completed, which circuit is traced as follows:—from the positive terminal of a suitable source of electrical potential indicated as B+, through wire 73, winding of circuit controller $CC^{ra}$, wire 74, back contact 75 of overload device $OL^a$, wire 76, contacts $5^a$—$39^a$, wire 77, contact $11^a$ in a right-hand normal position, to the negative terminal of the suitable source indicated as B—. The circuit controller $CC^{ra}$ is thus energized closing the reverse operating circuit of the switch machine $SM^a$, which is traced as follows:—from the positive terminal of a suitable source of electrical potential indicated as B+, through wires 78 and 79, deenergized contact $15^a$, wire 80, blow-out coil $19^a$, wire 81, armature $A^a$, wire 82, winding 70 of overload device $OL^a$, wire 83, blow-out coil $20^a$, wire 84, energized contact $16^a$ of circuit controller $CC^{ra}$, wires 85 and 86, winding of brake $BR^a$, wire 87, field winding $F^a$, to the negative terminal of the suitable source indicated as B—. Should an overload occur during the reverse operation of the switch machine $SM^a$, the overload device $OL^a$ would operate its contacts closing a stick circuit including its winding 72 and its armature 75 with the current flowing through the winding 72 in a direction corresponding to the flow of the reverse operating current in its overload winding 70. This stick circuit is traced as follows:—from the positive terminal of a suitable source of electrical potential indicated as B+, through winding 72 of overload device $OL^a$, wire 88, front contact 75 of overload device $OL^a$, wire 76, contacts $5^a$—$39^a$, wire 77, contact $11^a$ of relay $CR^a$ in its right-hand position, to the negative terminal of the suitable source indicated as B—.

Assuming the switch machine $SM^a$ to be in its reverse position, and that the contact $11^a$ of control relay $CR^a$ is just operated to its left-hand normal position, an energizing circuit for the normal circuit controller $CC^{na}$ is completed, which circuit is traced as follows:—from the positive terminal of a suitable source of electrical potential indicated as B+, through wire 89, winding of normal circuit controller $CC^{na}$, wire 90, back contact 91 of overload device $OL^a$, wire 92, contacts $6^a$—$54^a$, wire 93, contact $11^a$ of relay $CR^a$ in its left-hand position, to the negative terminal of the suitable source indicated as B—. With the contact $15^a$ in its attracted position the normal operating circuit of the switch machine $SM^a$ is completed, which circuit is traced as follows:—from the positive terminal of a suitable source of electrical potential indicated as B+, through wires 78 and 94, deenergized contact $16^a$ of reverse circuit controller $CC^{ra}$, wire 84, blow-out coil $20^a$, wire 83, winding 70 of overload device $OL^a$, wire 82, armature $A^a$, wire 81 of blow-out coil $19^a$, wire 80, energized contact $15^a$, of circuit controller $CC^{na}$, wires 95 and 86, winding of brake $BR^a$, wire 87, field winding $F^a$, to the negative terminal of the suitable source indicated as B—.

It is noted that the operating current for the switch machine armature $A^a$ during its operation to its normal position, is opposite in direction to that during its operation to its reverse position. As the winding 70 of overload device $OL^a$ is included in the armature circuit, or in other words, in the part of the switch machine control circuit which is reversed to accomplish the reversal of the switch machine $SM^a$, the winding 72 must be connected oppositely in respect to winding 71, so that if an overload occurs and its normal stick circuit is closed, then the armature of overload device $OL^a$ will remain in its energized position. The normal stick circuit for the overload device $OL^a$ is traced as follows:—from the positive terminal of a suitable source of electrical potential indicated as B+, through winding 71 of overload device $OL^a$, wire 96, front contact 91 of overload device $OL^a$, wire 92, contacts $6^a$—$54^a$, wire 93, contact $11^a$ of relay $CR^a$ in its left-hand position, to the negative terminal of the suitable source indicated as B—.

It is pointed out, that should the switch machine $SM^a$ be in operation with the point detector contacts $PD^a$ in positions such that contacts $5^a$—$39^a$ and contacts $6^a$—$54^a$ are closed, the switch machine could be reversed in midstroke as heretofore explained for Fig. 1. Also, if the overload device $OL^a$ is actuated due to an excessive operating current during a particular operation of the switch machine, it is obvious that the stick circuit for the overload device $OL^a$ corresponding to that particular operation of the switch machine is opened when the contact $11^a$ is operated to the opposite position. However, the opposite stick circuit might be immediately closed due to the extremely slow acting characteristics of the overload device OL<sup>a</sup>, but as the windings 71 and 72 are connected oppositely, the flux in the core of the overload device OL<sup>a</sup> is caused to reverse polarities and its value must necessarily pass through a zero point at which time the armature of the overload device OL<sup>a</sup> is caused to assume the deenergized position opening both its stick circuits. This is true although, in natural characteristics, the overload device OL<sup>a</sup> is of the slow acting type where the actual zero value of the flux occurs sometime after the energization of the second coil. Thus, the proper operation of the system is assured.

The further operations of Fig. 2 are identical to those explained for Fig. 1 and will not be pointed out in detail. The characteristic advantage of the embodiment of the invention shown in Fig. 2, is that the use of one overload device insures that the overload operating characteristics for each operation of the switch machine must be identical as the same device is involved in each operation.

Although specific devices have been shown and described, it is to be understood that various changes may be made to adapt the invention to the various requirements of interlocking practice. For example, the type of overload device may be varied to suit the requirements of the motor, the type of load which is operated and to the current supply. Also, the switch machine may be of any suitable type provided with a motor of the single or double field winding type which may or may not be provided with an electromagnetic brake.

Thus, an interlocking system of the remotely controlled type is provided which accomplishes the control of a switch machine in a safe and reliable manner for all operating conditions to be met in practice, and at no time and under no circumstances does the switch machine escape the control of the operator.

The circuits and devices included in this specific embodiment of the present invention as shown, are used to facilitate in the disclosure of the invention rather than to set forth a preferred form; and it is to be understood that many modifications, adaptations and alterations may be made to the present invention to meet the requirements of practice without departing from the spirit and scope of the invention as set forth in the appended claims.

Having described my invention, I now claim:—

1. In an interlocking system for railroads, a track switch, a switch machine having a reversible motor with a normal operating circuit and a reverse operating circuit, a normal relay for closing said normal operating circuit, a normal cut-out device for causing said normal relay to open said normal operating circuit if the current flow therein is excessive, a stick circuit for said normal cut-out device closed when said cut-out device is actuated, a reverse relay for closing said reverse operating circuit, a reverse cut-out device for causing said reverse relay to open said reverse operating circuit if the current flow therein is excessive, a stick circuit for said reverse cut-out device closed when said cut-out device is actuated, and means for opening said stick circuits alternately upon alternate operation of the switch machine.

2. In an interlocking system for railroads, a switch machine with a reversible motor having a normal operating circuit and a reverse operating circuit, a control relay having a polar contact operable to normal or reverse positions, a normal circuit controller for closing said normal operating circuit and having an energizing circuit energized with said polar contact in a normal position, an over-load protective device in said normal operating circuit effective to open said energizing circuit for said normal circuit controller when excessive current flow occurs in said normal operating circuit and effective when so actuated to close a stick circuit including said polar-contact in a normal position, a reverse circuit controller for closing said reverse operating circuit and having an energizing circuit energized with said polar contact in a reverse position, an over-load protective device in said reverse operating circuit effective to open said energizing circuit for said reverse circuit controller when excessive current flow occurs in said reverse operating circuit and effective when so actuated to close a stick circuit including said polar contact in a reverse position, whereby each of said over-load protective devices is restored to a normal condition closing the respective one of said energizing circuits for the respective one of said circuit controllers when its respective stick circuit is opened by said polar contact being operated to an opposite position.

3. In an interlocking system for railroads, a switch machine having operating circuits, contacting means for opening and closing said operating circuits, an over-load protective device included in said operating circuits being actuated to open said circuits if excecssive current flows therein, said device having stick circuits for maintaining said device actuated, and means for restoring said over-load protective device to an unactuated condition upon the deenergization of said stick circuits, or upon their sequential energization.

4. In an interlocking system for railroads, a switch machine having a normal and a reverse operating circuit, a normal contactor for closing said normal operating circuit, a reverse contactor for closing said reverse operating circuit, a two position relay for energizing either said normal or said reverse contactor, a single over-load device included in said normal and reverse operating circuits for deenergizing said normal and said reverse contactors when actuated by excessive current flowing in said operating circuits, means for maintaining said over-load device actuated, said means effective for restoring said device to normal when said two position relay is operated to a new position.

5. In an interlocking system for railroads, a switch machine having a normal and a reverse operating circuit, contacting means for opening and closing said normal and reverse operating circuits, an over-load protective device included in said normal and reverse operating circuits in a manner that the normal operating current flows in one direction through said device and that the reverse operating current flows in an opposite direction through said device, one winding on said over-load device included in a stick circuit when said device is actuated during a normal operation, said stick circuit current flowing in a direction corresponding to the direction of the operating current flow for that operation, and another winding on said over-load included in a stick circuit when said device is actuated during a reverse operation, said stick circuit current flowing in a direction corresponding to the direction of the operating current flow for that operation, whereby said over-load protective device is restored to normal during the sequential energization of said stick circuits.

6. In an interlocking system for railroads, a switch machine for operating a track switch, electrically operated circuit closing means for, when energized, closing operating circuits for said switch machine one at a time, an over-load protective device included in one of said operating circuits effective to open such operating circuit when an excessive current flows therein, and a stick circuit for said over-load device to maintain it active until said circuit closing means is deenergized.

7. In an interlocking system for railroads, a switch machine for operating a track switch, electrically operated circuit closing means for, when energized, closing operating circuits for said switch machine one at a time, an over-load protective device included in one of said operating circuits effective to open such operating circuit when an excessive current flows therein, and a stick circuit for said over-load device including a contact of said circuit closing means, whereby said over-load device is maintained effective until said circuit closing means is deenergized.

8. In an interlocking system for railroads, a switch machine having an electric motor and operating circuits therefor; contact means for opening and closing said operating circuits of said motor; an electro-magnetic over-load protective device having windings and contacts, one of said windings being included in said operating circuits for actuating said contacts to picked up positions when excessive current flow occurs to thereby open said operating circuits; and stick circuit means including certain of said contacts and another of said windings to thereby maintain picked up the contacts of said electro-magnetic protective over-load device following the deenergization of one of said motor operating circuits after an excessive current flow therein.

9. In an interlocking system for railroads; a switch machine having an electric motor with operating circuits; electro-magnetic contactor means for closing and opening the operating circuits of the switch machine motor; manually operable means for governing said electro-magnetic contactor means; electro-magnetic over-load protective means responsive to excessive over-load currents in the operating circuits of the switch machine motor to cause said electro-magnetic contactor means to open the operating circuits of the switch machine motor; and stick circuit means for said electro-magnetic over-load protective means, said stick circuit means being operable, when said electro-magnetic protective means has responded to excessive current, to maintain said electro-magnetic over-load protective means effective to cause said electro-magnetic contactor means to maintain open the operating circuits of the switch machine motor, and said stick circuit means being governed by said manually operable means.

10. In combination; an electric motor having operating circuits capable of causing operation of the motor in either direction; manually governed means for controlling and operating circuits to determine the direction of operation of the motor; electro-magnetic over-load protective means included in the operating circuits in such a way that the operating current flow therethrough is in opposite directions for the opposite operations of said motor; and stick circuit means for said electro-magnetic over-load protective means, said stick circuit means providing that its direction of current flow corresponds to the direction of the operating current flow for each direction of operation, and said stick circuit means being controlled by said manually governed means.

11. In combination, an electric motor, a first and a second relay, a normal circuit controlled by said first relay for supplying said motor with current when said first relay is energized, a reverse circuit controlled by said second relay for supplying said motor with current when said second relay is energized, over-load relay means associated with each of said normal and reverse circuits and responsive to the magnitude of the current supplied to said motor for modifying the control of said normal and reverse circuits by said first and second relays respectively, manually controlled means for at times energizing said first relay and for at times energizing said second relay, and stick circuits controlled by said manually controlled means for maintaining the energization of each of said over-load relay means.

12. In combination, an electric motor, a first and a second relay, a normal circuit controlled by said first relay for supplying said motor with current when said first relay is energized, a reverse circuit controlled by said second relay for supplying said motor with current when said second relay is energized, an over-load relay associated with both said normal and reverse circuits and responsive to the magnitude of the current supplied to said motor for modifying the control of said normal and reverse circuits by said first and second relays respectively, manually controlled means for at times energizing said first relay and for at times energizing said second relay, and stick circuits for said over-load relay controlled by said manually controlled means.

13. In combination, an electric motor having field and armature windings, a normal operating circuit including said field and armature windings in one relationship, a reverse operating circuit including said field and armature windings in another relationship, an over-load relay having a winding included in said normal and reverse operating circuits in such a manner that the direction of current flow in said winding is opposite for said normal and reverse operating circuits, said over-load relay beng responsive to pick up its contacts upon excessive current flow in said normal and reverse operating circuits to cause the opening of said operating circuits respectively, normal or reverse stick circuits for said over-load relay closed when said over-load relay picks up depending upon whether normal or reverse operation is interrupted, each of said normal and reverse stick circuits having a direction of current flow corresponding to its respective normal or reverse operating circuit, and manually governable means for controlling said normal and reverse operating and stick circuits.

14. In an interlocking system for railroads, a switch machine having a normal and a reverse operating circuit, contactor means for opening and closing said normal and reverse operating circuits, an over-load protective relay included in said normal and reverse operating circuits in a manner that the normal operating current flows in one direction through said relay and that the reverse operating current flows in the opposite direction through said relay, said over-load relay being responsive to pick up its contacts upon excessive current flow in said operating circuits, a normal stick circuit for said over-load relay closed when said over-load relay is picked up during the closed condition of said normal operating circuit, said stick circuit current flowing in a direction corresponding to the direction of the current flow in the normal operating circuit, a reverse stick circuit for said over-load relay closed when said over-load relay is picked up during the closed condition of said reverse operating circuit, said reverse stick circuit current flowing in a direction corresponding to the direction of current flow in the reverse operating circuit, and manually governed means for controlling said normal and reverse operating and stick circuits, whereby said over-load relay is released whenever its stick circuits are deenergized or are energized successively.

15. In an interlocking system for railroads; a track switch; a switch machine for operating said track switch, said switch machine having an electric motor for operating it to normal or reverse positions; a point detector contact mechanism jointly operated by said track switch and said switch machine, said mechanism having a first contact which is closed at all times except when said track switch is in a reverse locked position, and said mechanism having a second contact closed at all times except when said track switch is in a normal locked position; a two-position contactor having a control contact operable to either normal or reverse positions; a normal contactor; a reverse contactor; a normal operating circuit for supplying energy to said electric motor closed when said normal contactor is energized; a reverse operating circuit for supplying energy to said electric motor when said reverse contactor is energized; an over-load relay having a winding included in both said normal and reverse operating circuits; an energizing circuit for said normal contactor, closed when said second contact is closed and said control contact of said two-position contactor is in a normal position; an energizing circuit for said reverse contactor closed when said first contact is closed and said control contact of said two-position contactor is in a reverse position; means opening said energizing circuits for said normal and reverse contactors when said over-load relay is picked up in response to an excessive current flow in said normal and reverse operating circuits; a normal stick circuit for said over-load relay including its own front contact and said control contact of said two-position contactor in a normal position; and a reverse stick circuit for said over-load relay including its own front contact and said control contact of said two-position contactor in a reverse position.

16. In combination, an electric motor, a first and a second relay, a normal circuit controlled by said first relay for supplying said motor with current when said first relay is energized, a reverse circuit controlled by said second relay for supplying said motor with current when said second relay is energized, over-load relay means associated with each of said normal and reverse circuits and responsive to the magnitude of the current supplied to said motor for modifying the control of said normal and reverse circuits by said first and second relays respectively, by controlling the energizing circuits of said first and second relays respectively, manually controlled means for at times energizing said first relay and for at times energizing said second relay, and stick circuits controlled by said manually controlled means for each of said over-load relay means.

CHARLES S. BUSHNELL.